United States Patent [19]
Elsdon et al.

[11] Patent Number: 5,797,511
[45] Date of Patent: Aug. 25, 1998

[54] CAP WITH FLEXIBLE RETAINING MEANS

[75] Inventors: Stanley Robert Elsdon, Islington; Gordon Elford Fairles, Toronto; Arthur S. Cornford, Mississauga, all of Canada

[73] Assignee: EMCO Wheaton Fleet Fueling Corp., Toronto, Canada

[21] Appl. No.: 605,768

[22] Filed: Feb. 22, 1996

[30] Foreign Application Priority Data

Feb. 6, 1996 [CA] Canada ................. 2168797

[51] Int. Cl.⁶ ...................................... B65D 45/16
[52] U.S. Cl. .................. 220/326; 220/335; 220/337; 220/784; 215/245
[58] Field of Search ................... 220/334, 335, 220/337, 375, 326, 780, 784; 215/237, 238, 244, 245, 239, 240, 241, 242, 306

[56] References Cited

U.S. PATENT DOCUMENTS

| | | | |
|---|---|---|---|
| D. 353,444 | 12/1994 | Merrett . | |
| 1,628,108 | 5/1927 | Brown et al. | 215/245 X |
| 1,688,622 | 10/1928 | Johnson | 220/326 X |
| 1,720,789 | 7/1929 | Heusser | 220/335 |
| 2,157,937 | 5/1939 | Koscherak | 215/245 |
| 2,217,765 | 10/1940 | Murdock | 215/245 X |
| 2,443,095 | 6/1948 | Conant | 215/245 |
| 3,271,938 | 9/1966 | Rest et al. | 220/326 X |
| 4,494,673 | 1/1985 | Hiraishi . | |
| 4,638,916 | 1/1987 | Beck et al. . | |
| 4,706,841 | 11/1987 | Grajek . | |
| 4,795,044 | 1/1989 | Beck . | |
| 4,960,219 | 10/1990 | Jordan et al. . | |
| 5,161,706 | 11/1992 | Weinstein . | |
| 5,322,176 | 6/1994 | Dubach . | |
| 5,358,323 | 10/1994 | Ripley . | |
| 5,402,900 | 4/1995 | Glynn . | |
| 5,452,819 | 9/1995 | Vance . | |

FOREIGN PATENT DOCUMENTS

| | | |
|---|---|---|
| 29951 | 12/1992 | Australia . |
| 1235585 | 4/1988 | Canada . |
| 2639030 | 10/1989 | France . |
| 2355818 | 11/1973 | Germany . |
| 3212689 | 3/1992 | Germany . |

*Primary Examiner*—Stephen Cronin
*Attorney, Agent, or Firm*—Woodcock Washburn Kurtz Mackiewicz & Norris, LLP

[57] ABSTRACT

A cap and cap arrangement for covering a necked opening preferably for use with fuel tank fill racks, the cap arrangement comprising: a cap, the cap having an open and a closed position; flexible retaining means for securing the cap to the neck in proximity to the opening, the flexible retaining means extending between the cap and the neck and arranged to provide a non-fixed pivot point in a plane laterally spaced from the cap and neck so that the cap pivots between its open and closed positions, and the cap having internal spring means positioned to engage the necked opening with sufficient tension to retain the cap in its closed position but to permit easy withdrawal of the cap upon application of suitable pressure to the cap.

20 Claims, 5 Drawing Sheets

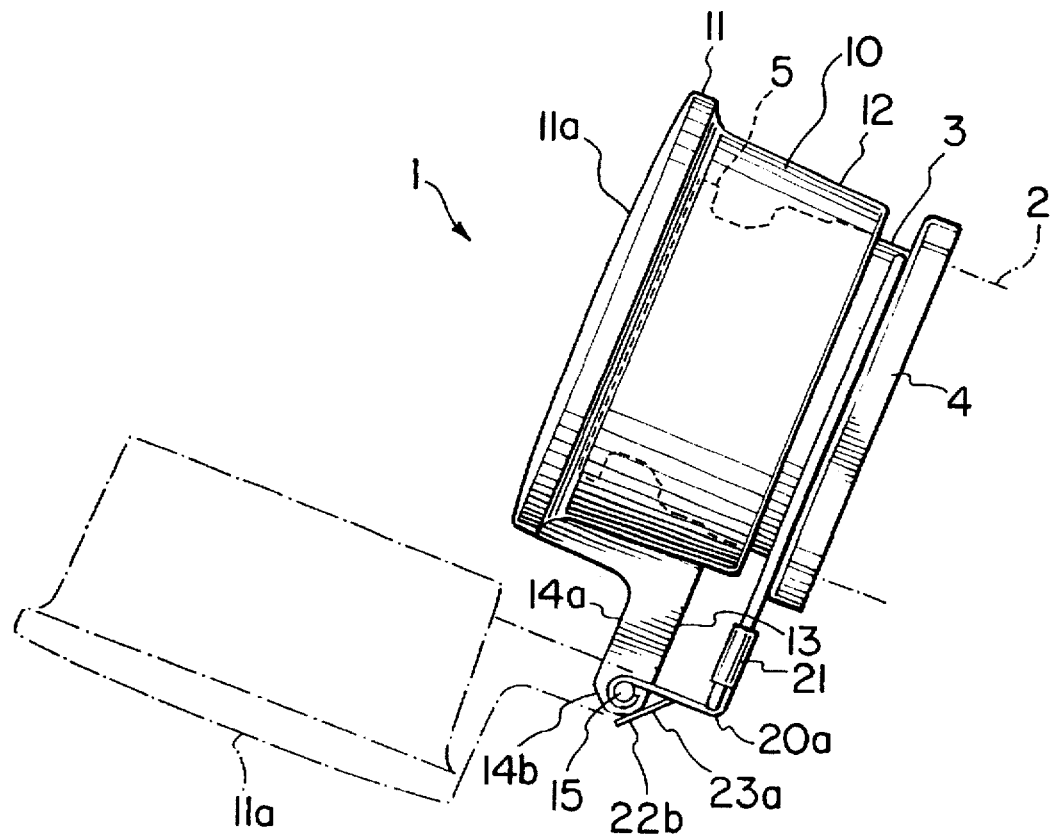
FIG. 1
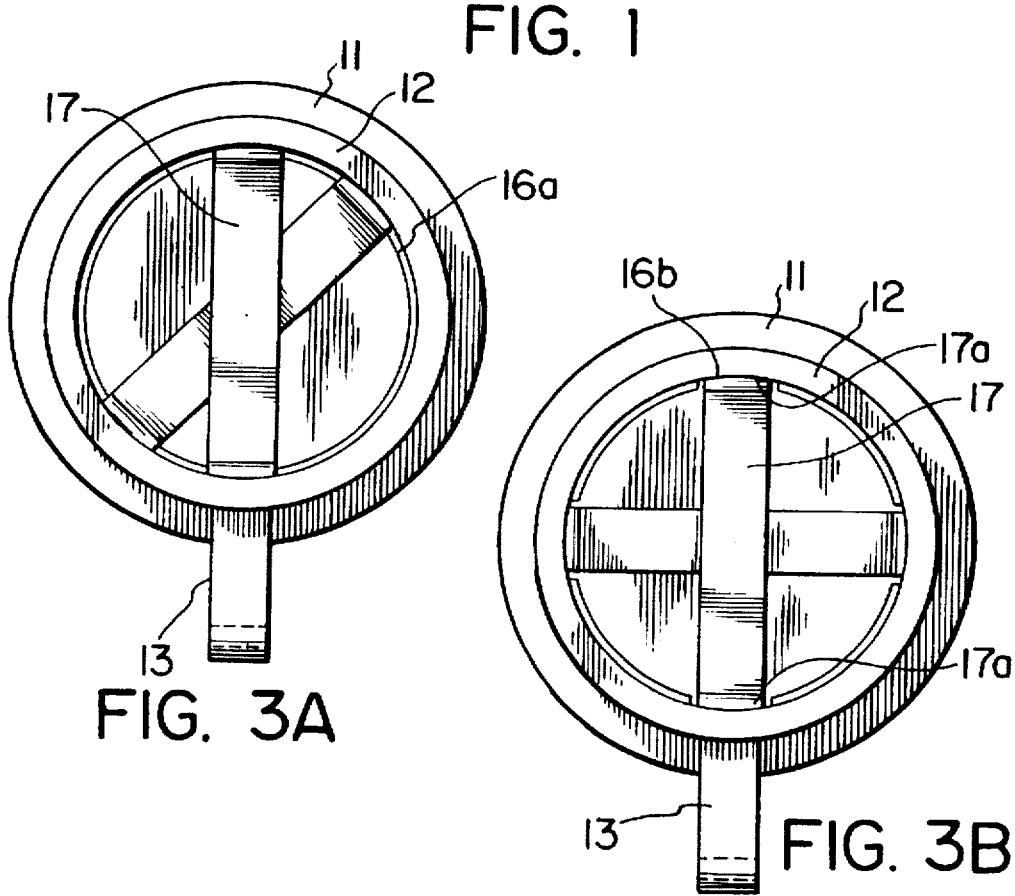
FIG. 3A
FIG. 3B

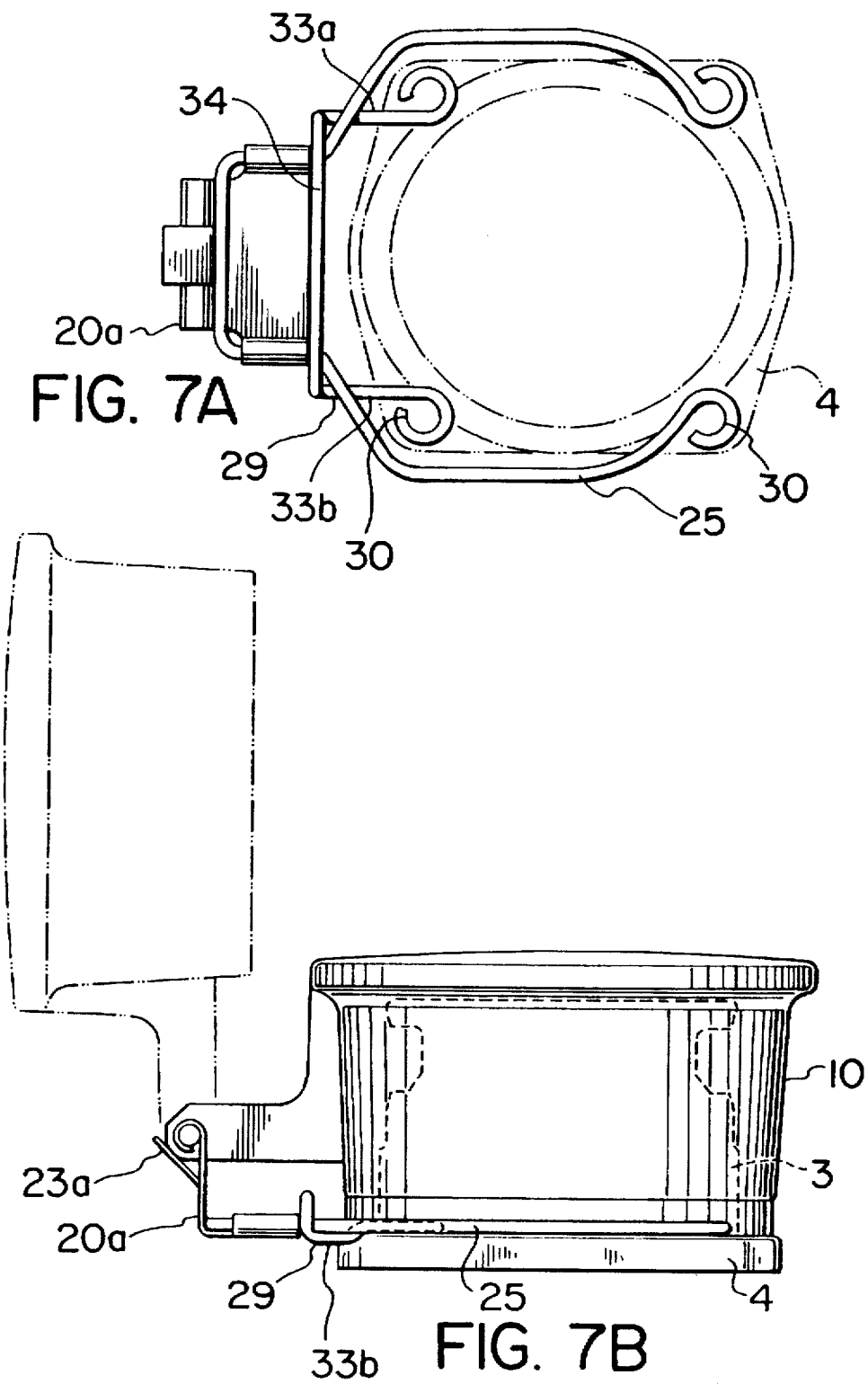

CAP WITH FLEXIBLE RETAINING MEANS

FIELD OF THE INVENTION

This invention relates to a novel cap and a novel cap arrangement for necked openings, the cap arrangement comprising a cap and a flexible retaining means which permits the cap to be opened and closed in a continuous smooth motion and retained in close proximity to the necked opening. Furthermore, it relates to a novel cap arrangement for fuel tank and fuel tank fill neck openings which terminate at their outer ends with an adapter for attachment to a fuelling nozzle. The cap protects the opening from the environment between fuelling operations. The cap by itself may be used for other openings as will be apparent to a person skilled in the art.

BACKGROUND OF THE INVENTION

There is a need for a cap for a necked opening which can be easily and quickly opened and closed. The need is especially apparent with regard to the environmental protection of fuel tank fill necks. Such fill necks may be completely exposed to road hazards and weather conditions, as is usually the case with trucks and the like, or they may be partially enclosed behind a door in the side of the vehicle body, as is usually the case with buses and similar vehicles. In the latter case, the fuel tank enclosure is usually open on the underside and the fill neck is still vulnerable to debris and contaminants thrown up from the road.

The caps currently being used in such applications usually comprise a cap which is retained on the fuel neck or fuel neck adapter by means of a bayonet or screw type locking system otherwise used by the fuelling nozzle. When the cap is removed for fuelling operations, it is retained on a chain or strap.

There are disadvantages to the known arrangement. During the winter, the operators wear heavy gloves making it awkward to grasp the cap and turn it for removal or replacement. Furthermore, the chain can be easily broken, or disconnected so that the cap can be easily lost. In the case of the use of both a chain and a strap, the cap, when removed is in a position with regard to the necked opening which makes it difficult to grasp the top of the cap or requires the operator to fish for it for replacement.

In the case where a cap containing internal springs is used, conventional methods of retaining the spring in the cap include fastening the spring at its centre with, for instance, a rivet or a screw through a central hole in the spring and threaded hole in the cap. This conventional method of retaining a spring in the cap has many disadvantages including the fact that preventing the spring from assuming its natural deflection by restraining it at its centre creates a concentration of bending stresses near the ends of the spring thereby increasing the potential for failure. Second, upon withdrawal of the cap, the spring bows in the opposite direction to that cited above resulting in a tighter grip on a rim of the opening making it extremely difficult to remove.

It is difficult to design a cap arrangement which overcomes all of the above disadvantages and which is adapted to fit into a limited and often confined area normally associated with fuel tank fill necks.

SUMMARY OF THE INVENTION

This invention provides a cap arrangement which is easy to use under all circumstances, which provides effective environmental protection to a necked opening, and, in the case of fuel tank fill necks, encourages the operator to make sure the cap is applied properly to the fill neck between refuelling operations. Furthermore, this invention overcomes the problem of space by providing a cap arrangement which is kept in close proximity to the fuel tank fill neck when removed for accessing the fill neck.

This invention relates to a cap arrangement for covering a necked opening. The cap arrangement comprises: a cap, the cap having an open and a closed position and flexible retaining means for securing the cap to the neck in proximity to the opening. The flexible retaining means extends between the cap and the neck and is arranged to provide a non-fixed pivot point in a plane laterally spaced from the cap and neck so that the cap pivots between its open and closed positions. The cap has internal spring means positioned to engage the necked opening with sufficient tension to retain the cap in its closed position but to permit easy withdrawal of the cap upon application of suitable pressure to the cap.

The internal spring means preferably comprises at least one spring, and more preferably at least two. The ends of the spring are held by internal spring retaining means formed in the cap, wherein the retaining means preferably comprises an internal annular recess or pocket indents sized to receive and retain the ends of the spring. When pocket indents are used, the number of indents will at least correspond to the number of spring ends. A person skilled in the art would know upon reading this disclosure suitable types of internal springs which could be used.

Similarly, with regard to the flexible retaining means, a person skilled in the art would be familiar with a number of suitable shapes for the flexible retaining means, but it is preferable that it is selected from springs comprising L-shaped and U-shaped springs.

In one embodiment of the invention, the flexible retaining means is secured to the neck of the opening by a wireform or metal plate which engages the neck of the opening and is fastened thereto by suitable fastening means. In a preferred embodiment, the flexible retaining means is secured to the neck of the opening by a wireform.

In a more preferred embodiment, the cap arrangement further comprises an overload restraint which limits deformity of the flexible retaining means, preferably a flexible retaining spring, upon use. Preferably the overload restraint comprises a wireform and is secured to the neck of the opening. The overload restraint is so shaped as to limit movement of the wireform or metal plate of the flexible retaining spring thereby limiting deformity of the spring during use.

In another embodiment of the invention, the cap has an extension member integral thereto and at its distal end is hinged to the flexible retaining means so that the cap pivots between its open and closed positions, the flexible retaining means arranged to provide a non-fixed pivot point in a plane laterally spaced from the cap and neck.

It is preferred that the flexible retaining means has a detent means which when the cap is open, bears firmly on a flat surface of the extension member and forces the cap to remain open and clear of the necked opening, preferably in an approximately 90 degree position from its closed position.

In a more preferred embodiment, this invention relates to a cap arrangement for covering a necked opening, having an open and closed position, the arrangement comprising:

(a) a cap having at least one internal spring which is retained within the cap by an internal annular recess or pocket indents corresponding in number to the spring ends, the at least one internal spring positioned to engage a rim of the necked opening with sufficient tension to retain the cap in its closed position but to permit easy withdrawal of the cap upon application of suitable pressure to the cap, (b) an extension member extending from the cap and integral therewith; and (c) a flexible retaining spring for securing the cap to the neck in proximity to the opening, the flexible retaining spring having first and second ends and being hinged at its first end to the distal end of the extension member providing a non-fixed pivot point which is in a plane laterally spaced from the cap and neck whereby the cap pivots between its open and closed positions, and at its second end is coupled to the neck of the opening.

In a most preferred embodiment, the invention relates to a cap arrangement for a fuel tank fill neck which terminates at its outer end with an adapter for coupling to a fuelling nozzle, the cap arrangement having an open and closed position, the arrangement comprising:

(a) a cap having two internal springs which are retained within the cap by pocket indents corresponding in number to the number of spring ends and positioned so that at least one internal spring is positioned in the indents to engage a rim of the adapter with sufficient tension to retain the cap in its closed position but to permit easy withdrawal of the cap upon application of suitable pressure to the cap, (b) an extension member extending from the cap and integral therewith; and (c) a flexible retaining spring for securing the cap to the neck in proximity to the opening, the flexible retaining spring having first and second ends and being hinged at its first end to the distal end of the extension member providing a non-fixed pivot point which is in a plane laterally spaced from the cap and neck whereby the cap pivots between its open and closed positions. The first end further comprising a detent which when the cap is open bears firmly on a flat surface of the extension member and forces the cap to remain open and clear of the necked opening and permits the cap to be moved to its closed position upon application of suitable pressure to the cap, the flexible retaining spring being secured to the adapter at its second end by a wireform, the cap arrangement further comprising an overload restraint which is secured to the adapter and is so shaped as to limit deformity of the retaining spring during use.

This invention further relates to a fuel tank fill neck arrangement comprising: a fuel tank fill neck which terminates at its outer end with an adapter for coupling to a fuelling nozzle; and a cap arrangement of the invention wherein the flexible retaining means extends from the cap to the adapter.

In another aspect, the invention relates to a fuel tank arrangement comprising a fuel tank having an opening which terminates with an adapter for coupling to a fuelling nozzle and a cap arrangement of the invention, wherein the flexible retaining spring extends from the cap to the adapter.

In yet another aspect, the invention relates to a cap comprising internal spring means, the internal spring means comprising at least one spring which is held by internal spring retaining means formed in the cap. The internal spring retaining means is preferably selected from the group consisting of an internal annular recess and pocket indents corresponding in number to the number of spring ends and the recess and indents being sized to receive and retain the ends of the spring. The internal spring retaining means and spring are positioned so that the spring engages a rim of the necked opening with sufficient tension to retain the cap but to permit easy withdrawal of the cap upon application of suitable pressure.

BRIEF DESCRIPTION OF THE DRAWINGS

The above brief description, as well as further aspects, features and advantages of the present invention, will be more fully appreciated by reference to the following drawings which are illustrative of the preferred embodiments of the invention but are not restricted thereto, where like features are numbered alike and wherein:

FIG. 1 is a side view of one possible arrangement of the fuel tank fill neck arrangement of the invention showing the cap in both the open (shadowed) and closed position;

FIG. 3A is a bottom view of a cap of the invention with an internal annular recess and internal springs;

FIG. 3B is a bottom view of a cap of the invention with four internal pocket indents and two internal springs;

FIG. 6A shows a wireform with 2 screw ports for attachment to the base of the adapter FIG. 6B shows a plate with 2 screw ports for attachment to the base of the adapter FIG. 6C shows a plate with 2 screw ports for attachment to the base of the adapter.

FIG. 7A is a top and part section view of the cap arrangement of the invention showing the wireform and overload restraint combination.

FIG. 7B is a cross-section of the cap arrangement of the invention with wireform and overload restraint.

DETAILED DESCRIPTION OF THE INVENTION

Figures 2A, 2B:
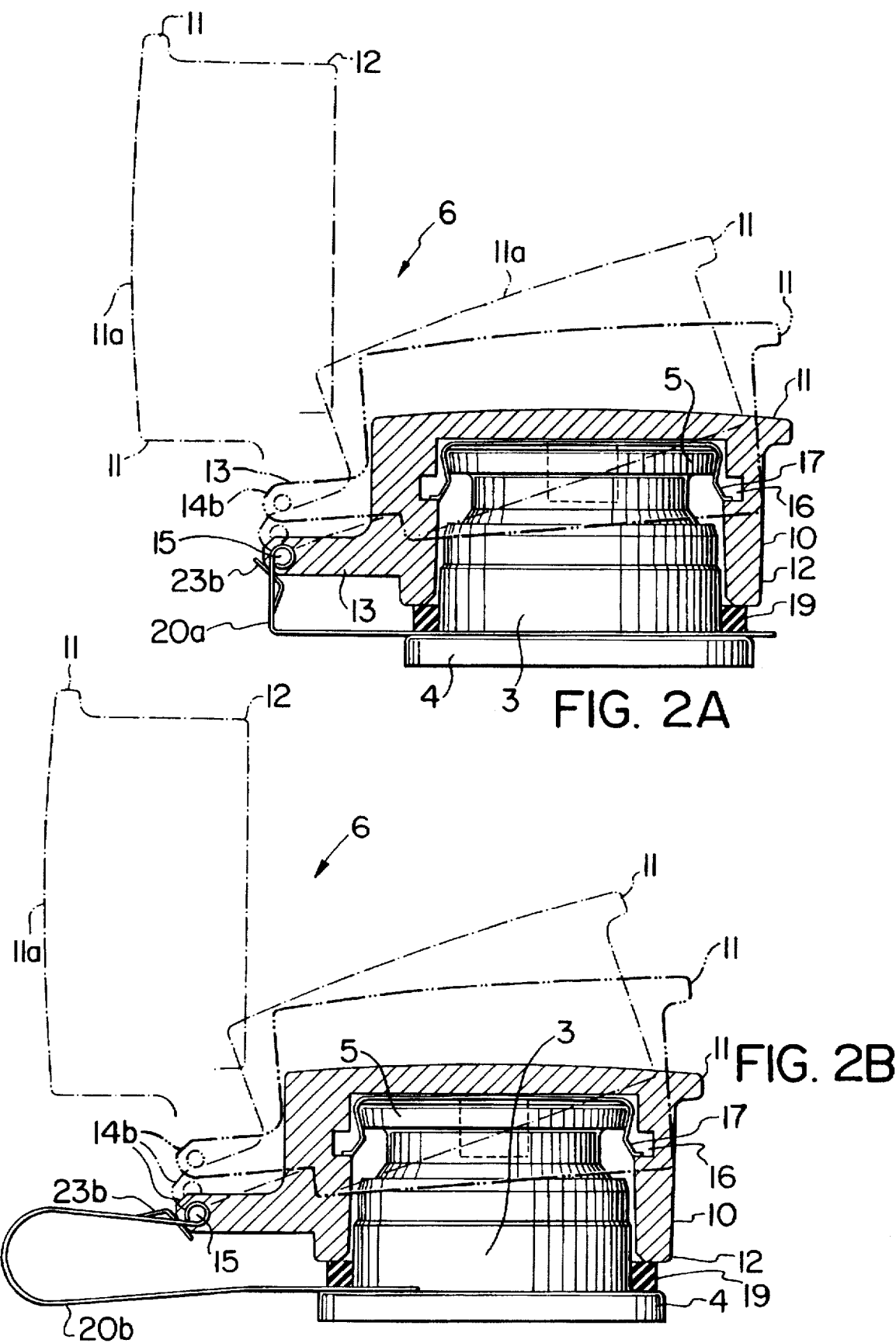
FIG. 2A is a cross-section of a suitable cap arrangement with an L-shaped retaining spring and illustrating the slight movement of the pivot point in a plane laterally spaced from the cap and neck during the opening and closing of the cap.
FIG. 2B is the same as FIG. 2A showing the cap arrangement with a U-shaped retaining spring.

FIG. 1 illustrates a side view of a fuel tank fill neck arrangement 1 of the invention comprising a fuel tank fill neck 2 which terminates at its outer end with an adapter 3, and the cap arrangement 6 (as shown in FIG. 2A and B) of this invention. The adapter 3 is for coupling the fuel tank fill neck 2 to a fuelling nozzle (not shown) during refuelling. The cap 10 when closed protects the opening (not shown) of the fuel tank fill neck 2 from the environment.

Referring now to FIGS. 2A and 2B, the cap arrangement 6 comprises a cap 10, a flexible retaining spring 20a or 20b and a suitable attachment means 25, 26, 27 (as shown in FIGS. 6 and 7), for securing the flexible retaining spring 20a or 20b to the base 4 of the adapter 3. In a preferred embodiment of the cap 10, the top end 11 of the cap 10 has a larger perimeter than the rest of the cap 10 as shown in FIGS. 1, 2 and 3, making it easier for an operator to grasp the cap 10 during opening and closing.

In a preferred embodiment of the invention, one or more elastomeric sealing rings, preferably closed-cell elastomeric sealing rings 19, are slid over the body of the adapter 3. They are preferably of a rectangular cross section and of a dimension so that they are retained by the friction of a slight dimensional interference with the body. When the cap 10 is closed, it preferably presses on one or more of the closed-cell elastomeric sealing rings 19 to provide a satisfactory seal and protection against the environment.

The cap 10 has internal spring retaining means 16, preferably an annular recess 16a or pocket indents 16b (as shown in FIGS. 3A and 3B respectively) for placement of at least one, and preferably, at least two internal springs 17. The internal spring 17 is so shaped as to allow it to engage the rim 5 of the adapter 3 when the cap 10 is closed and applies sufficient pressure to retain the cap 10. The internal spring 17 so described provides a snap action during opening and closing of the cap.

The internal spring retaining means 16 as mentioned above can be an annular recess 16a as in FIG. 3A or it can consist of pocket indents 16b corresponding in number to the number of spring ends 17a, such as shown in FIG. 3B, for specific placement of an internal spring to ensure engagement of the spring over the rim 5 of the adapter 3 or other type of necked opening (not shown). The use of pockets 16b as opposed to an annular recess 16a may be preferable when the rim 5 of the adapter 3 is not continuous or has a series of slots (not shown) such as when a bayonet locking system is used for attachment of the adapter 3 to the fuelling nozzle (not shown). When two or more internal springs 17 are used, the relative position of the springs 17 in relation to each other is not important as long as at least one of the springs 17 engages the rim 5 of the adapter 3 or other type of necked opening (not shown) when the cap 10 is in its closed position.

Figure 4A:
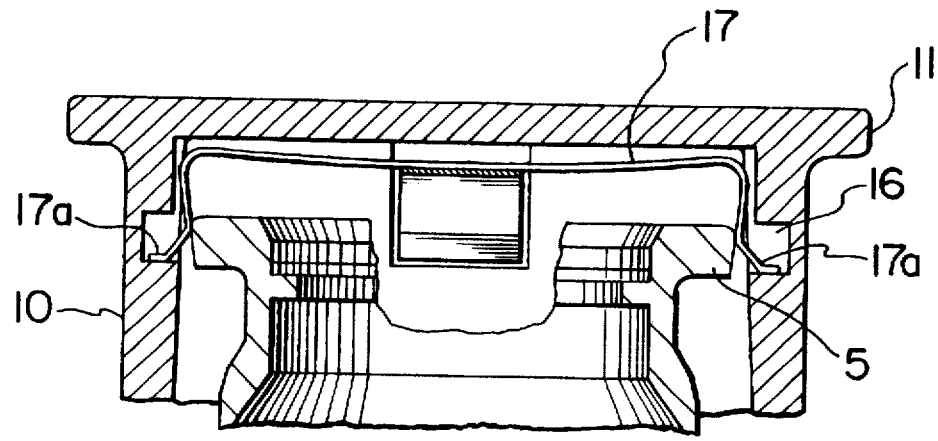
FIG. 4A and 4B are cross-sections of a cap of the invention showing placement of an internal spring in the annular recess or pocket indents of the cap, upon withdrawal FIG. 4A and seated FIG. 4B.
Figure 4B:
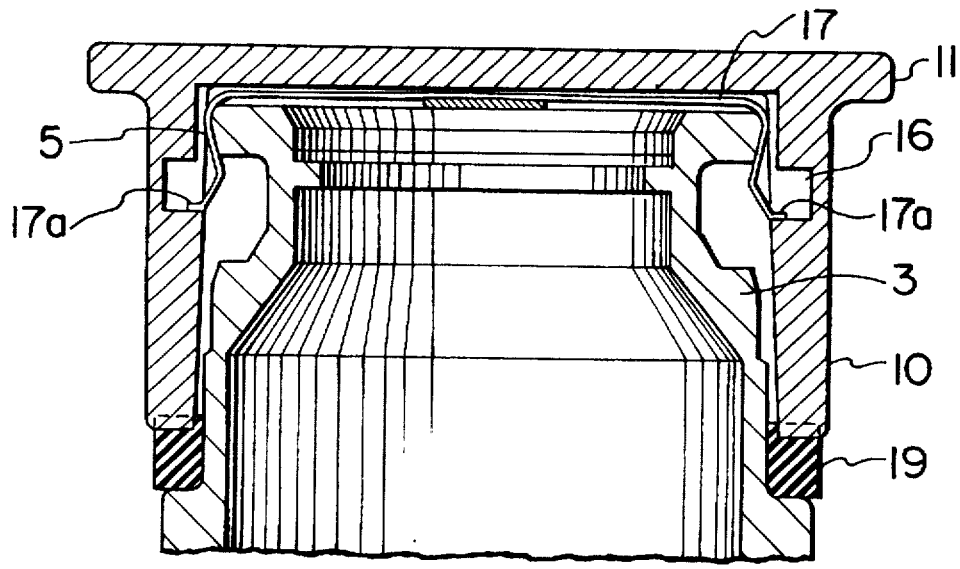

FIGS. 4A and 4B are cross-sections of the cap 10 of the invention showing the positioning of the internal spring in the cap engaging the rim 5 of the adapter 3 (FIG. 4B) and upon withdrawal (FIG. 4A). The internal spring is retained in the cap by internal spring retaining means 16. Although conventional methods of retaining a spring in a cap could be used, the use of an annular recess 16a or pocket indents 16b to retain the internal spring in the cap allows the spring 17 maximum freedom of movement, thus overcoming the disadvantages associated with conventional methods such as using a centrally positioned screw or rivet to secure suitable springs in place. The internal spring 17 can be assembled in the cap 10 of this invention by simply pushing it in until it clicks into place in the annular recess 16a or pocket indents 16b. The clearance between the spring ends 17a and the recess or indents is sufficient to allow the spring 17 to deflect freely, but small enough to centralize the spring 17 and control its attitude for easy engagement with the rim 5. It should be noted that the elongate shape of spring 17 is merely one example of a suitable spring. Alternative shapes would be apparent to a person skilled in the art.

A person skilled in the art would understand that the above identified cap could be used as shown in FIGS. 4A and 4B, with or without an extension member and with or without a flexible or a rigid retaining means extending from the cap to the neck of the opening. In such instance it could be used to cover many openings given its novel features.

Referring back to FIGS. 2A and 2B, the cap 10 preferably has an extension member 13 secured to it by suitable attachment means such as screws (not shown) through corresponding screw ports (not shown) in the extension member 13 and the cap 10. The extension member has a top surface 14a and a flat surface 14b which are positioned in relation to each other as shown in FIG. 1. At its distal end, the extension member 13 has a pin port 15b for accommodation of a hinge pin 15 by which the cap is secured to the second end 22 of the flexible retaining spring 20a or 20b through corresponding pin ports 15a permitting the cap to pivot between its open and closed position, about a non-fixed pivot point which is in a plane laterally spaced from the cap 10 and adapter 3.

The use of a flexible retaining spring 20, preferably an L-shaped, 20a or U-shaped, 20b flexible retaining spring, permits movement of the position of the pivot point which corresponds to the position of the hinge pin 15, in relation to the adapter 3. This allows the cap 10 to be opened by first pulling the cap 10 towards the operator, preferably in an about 90 degree angle from the opening and in an arc towards the pivot point 15, while retaining the cap 10 in close proximity to the adapter 3 as shown in FIGS. 2A and 2B. The flexible retaining spring 20a or 20b permits use of the cap arrangement 6 of this invention in a small or confined space such as in the case of fuel tank fill necks 2. The use of a rigid retaining spring or fixed pivot point and the necessary small clearance between the cap 10 and the adapter 3 would prevent the movement of the cap 10 from its open and closed positions as described above. In addition, the use of a rigid retaining spring or fixed pivot point would require greater distance between the second end 22 of the retaining spring 20a or 20b and the adapter 3 or an undesirable considerably greater clearance between the cap 10 and the adapter 3. The movement allowed by the flexible retaining spring 20a or 20b is slight but necessary.

The flexible retaining spring 20a or 20b has at its second end 22a detent means 23a or 23b, which is preferably integral with the retaining spring 20a or 20b. There are a number of shapes which would be suitable for the detent means 23a or 23b. Two suitable shapes 23a and 23b are shown in FIGS. 5A and 5B, respectively.

Figure 5A:
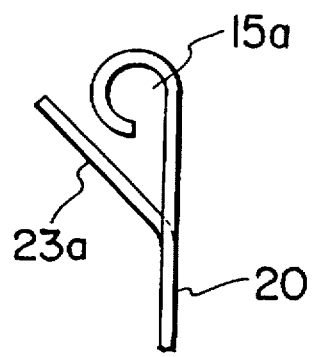
FIGS. 5A and 5B are side views of possible detent means suitable for the invention.

The detent means 23a in FIG. 5A consists of an arm 23a integral with and extending at an angle away from the flexible retaining spring 20 towards pin port 15a. When the flexible retaining spring is L-shaped 20a, the arm 23a is on the side of the flexible retaining spring 20a which is furthest away from the necked opening (not shown) or adapter 3 as shown in FIG. 1.

Figure 5B:
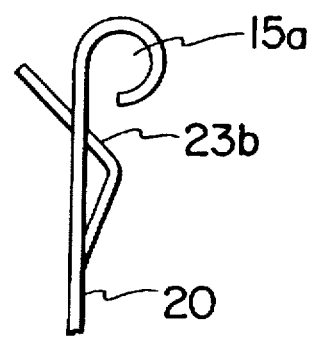

The detent means 23b illustrated in FIG. 5B consists of an arm 23b integral with the flexible retaining means 20, and extending at an angle away from and towards the pin port 15a and then crossing at an angle to the other side of the flexible retaining spring 20 in the direction of the pin port 15a. Both detent means 23a and 23b are arranged to bear firmly against a flat surface 14b of the extension member 13 when the cap is in its open position (see FIGS. 1, 2A and 2B).

Referring now to FIGS. 1 and 2, during opening, the cap 10 naturally pivots on the hinge pin 15 connecting it to the retaining spring 20a or 20b and assumes a position well clear of the adapter 3 and preferably an approximately 90 degree position from its closed position to facilitate fuelling operations. The detent means 23a or 23b restrains the cap 10 in a position which makes it easier for the operator to find and grasp the end 11 of the cap 10 for closing.

In a more preferred embodiment of the invention, the detent means 23a or 23b is composed of a material of sufficient strength so that it bears firmly against a flat surface 14b of the extension member 13 and thereby forces the cap 10 to remain in the open position preventing it from flopping forward during fuelling. The cap 10 is easily closed by simply applying sufficient pressure against its top surface 11a to overcome the detaining action of the detent means 23a or 23b and to cause it to pivot on the hinge pin 15 in the reverse direction to that applied during opening. Continued application of the pressure will cause the cap 10 to take up a position over the adapter 3 and engage itself thereon in one smooth motion.

Figure 6A:
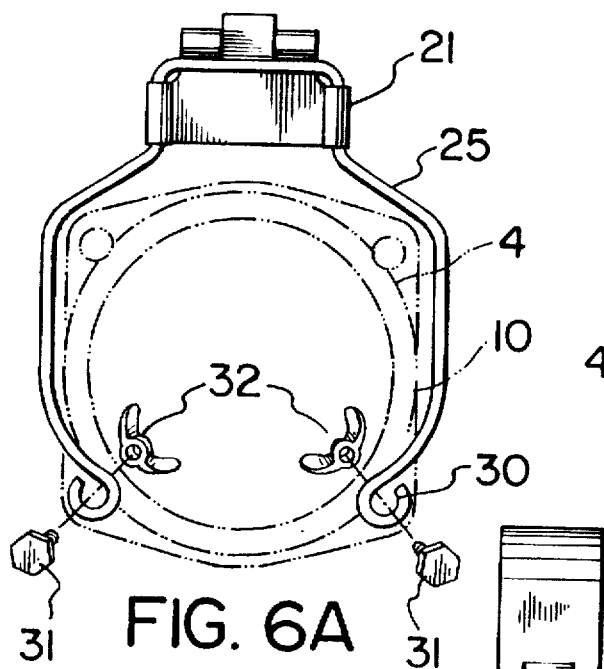
FIGS. 6A, 6B and 6C are top views of some suitable attachment means for attaching the flexible retaining spring to the neck of an opening, such as an adapter.
Figure 6B:
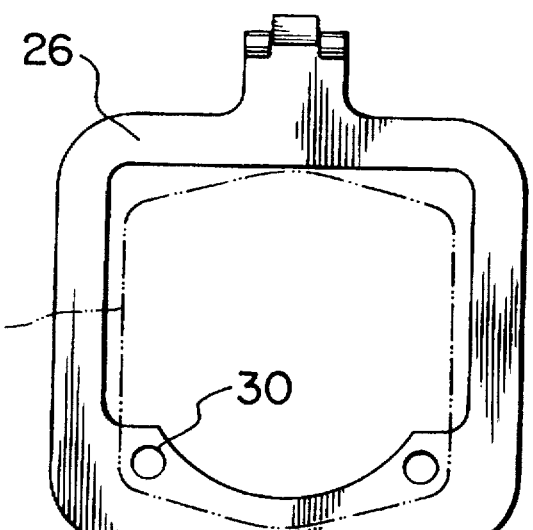
Figure 6C:
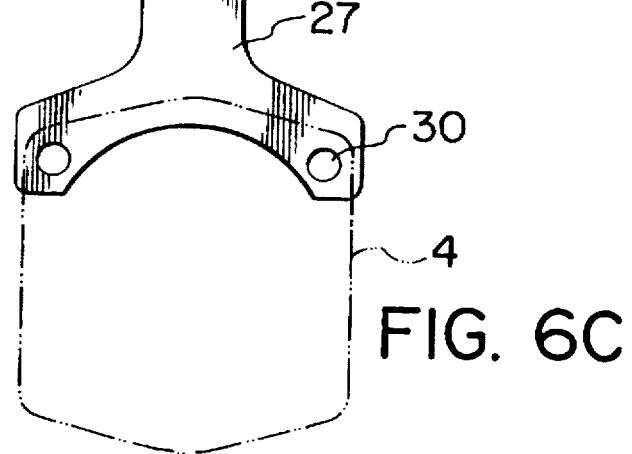

At its first end 21, the retaining spring 20a or 20b, is secured or integral with a suitable attachment means such as shown in FIGS. 6A, 6B, 6C, and 7A and 7B and designated generally as 25, 26, and 27 for attachment to the base 4 of the adapter 3. Each of the attachment means 25, 26, and 27 shown have 2 screw ports 30, but could possibly have more (not shown) for receiving screws 31. The base 4 of the adapter 3 has corresponding screw ports (not shown) for receiving the screws 31. The screws are secured in place by suitable securing means, such as nuts, e.g. a wing nut 32 as shown in FIG. 6A. The attachment means can be a plate 26, 27, preferably a metal plate as shown in FIG. 6B and 6C which partially (see element) 27 or fully encloses (see element) 26, the base 4 of the adapter 3. In a most preferred embodiment, the attachment means is a wireform 25 as illustrated in FIG. 6A. A wireform 25 attachment means does not, or in the least advantageous arrangement, minimally extends into the space around the fuel fill neck 2, or adapter 3 and overcomes the existence of a sharp raw edge which is present with the use of other types of attachment means and which presents a hazard to operators.

FIGS. 7A and 7B illustrate an even more preferred embodiment of the invention where an additional wireform or overload restraint 29 is used to limit the movement of the flexible retaining spring 20a as shown in FIGS. 7A and 7B. The overload restraint 29 has two side arms 33a, 33b and a connecting bar portion 34 as shown in FIG. 7A. Each side arm 33a, 33b is secured at one end to the base 4 of the adapter 3 by suitable fastening means (not shown) through corresponding screw ports 30. The side arms 33a, 33b then extend from the screw ports 30 towards the flexible retaining spring 20a and are shaped to dip below and then over the wireform 25 as shown in FIG. 7B. The side arms are then shaped as to extend to a position over the wireform 25. The side arms 33a, 33b being connected by a cross bar portion 34 which extends on a plane over the wireform 25. The overload restraint 29 increases the durability of the cap arrangement, preventing an operator from pulling or pushing the flexible retaining spring 20a when the cap is open resulting in deforming the spring 20a to a position which would interfere with the smooth operation of the cap arrangement 6 or prevent closure of the cap 10.

Although the overload restraint 29 is herein described as a secondary wireform, a person skilled in the art upon reading the disclosure would appreciate that the restraint can be of a variety of forms to achieve the same function. Secondly, a person so skilled would know that the overload restraint 29 could be adapted for use with other flexible retaining spring attachment means such as the metal plate 26 and 27. Such equivalents of the overload restraint 29 are intended to be encompassed within the scope of this disclosure and appended claims.

The cap 10 and extension member 13 are preferably composed of a plastic or a metal. A preferred plastic is a fibre reinforced acetal or nylon. A preferred metal is a light weight metal such as aluminum. The wireform 25 and plate 26, 27 attachment means, the overload restraint 29, and the flexible retaining spring 20 are preferably composed of a non-corrodible metal such as stainless steel. A person skilled in the art would be familiar with other suitable materials which could be used to compose the above-noted components. In particular, with regard to the retaining spring, a person so skilled would be familiar with other suitable spring steel materials which could be used.

While the invention has been described in detail with respect to specific aspects thereof, it will be appreciated that those skilled in the art, upon attaining an understanding of the foregoing, may readily conceive of alterations to, variations of and equivalents to these aspects, for instance the use of the above invention for other type of necked, or rimmed necked openings. Accordingly, the scope of the invention should be assessed as that of the appended claims and any equivalents thereto.

The embodiments of the invention in which an exclusive property or privilege is claimed are defined as follows:

1. A cap arrangement for covering a necked opening comprising: a cap, the cap having an open and a closed position; flexible retaining means for securing the cap to the neck in proximity to the opening, the flexible retaining means extending between the cap and the neck and arranged to provide a non-fixed pivot point in a plane laterally spaced from the cap and neck so that the cap pivots between its open and closed positions, and the cap having internal spring means for engaging the necked opening, the internal spring means positioned to engage the necked opening with sufficient tension to retain the cap in its closed position but to permit easy withdrawal of the cap upon application of suitable pressure to the cap.

2. The cap arrangement of claim 1 wherein the internal spring means comprises at least one spring, the ends of which are held by internal spring retaining means formed in the cap.

3. The cap arrangement of claim 2 wherein the internal spring retaining means comprises an internal annular recess.

4. The cap arrangement of claim 2 wherein the internal spring retaining means comprises pocket indents sized to receive and retain the ends of the spring.

5. The cap arrangement of claim 1 wherein the flexible retaining means is selected from springs comprising L-shaped and U-shaped springs.

6. The cap arrangement of claim 1 wherein the flexible retaining means is secured to the neck of the opening by a wireform or metal plate which engages the neck of the opening and is fastened thereto by suitable fastening means.

7. The cap arrangement of claim 6 further comprising an overload restraint which is secured to the neck of the opening and is so shaped and positioned as to limit deformity of the flexible retaining means during use.

8. The cap arrangement of claim 1 wherein the cap has an extension member integral thereto and at its distal end is hinged to the flexible retaining means providing a non-fixed pivot point positioned in a plane laterally spaced from the cap and neck so that the cap pivots between its open and closed positions.

9. The cap arrangement of claim 8 wherein the flexible retaining means has a detent means which when the cap is open, bears firmly on a flat surface of the extension member and forces the cap to remain open and clear of the necked opening.

10. The cap arrangement of claim 9 wherein the detent means forces the cap to remain in an approximately 90 degree position from its closed position.

11. A cap arrangement for covering a necked opening comprising: a cap, the cap having an open and a closed position; flexible retaining means for securing the cap to the neck in proximity to the opening, the flexible retaining means extending between the cap and the neck and arranged to provide a non-fixed pivot point in a plane laterally spaced from the cap and neck so that the cap pivots between its open and closed positions, and the cap having internal spring means for engaging the necked opening, the internal spring means comprising two elongate springs, the ends of which are held by retaining means, formed in the cap, comprising an internal annular recess or pocket indents corresponding in number to the number of spring ends, the internal spring means positioned to engage the necked opening with sufficient tension to retain the cap in its closed position but to permit easy withdrawal of the cap upon application of suitable pressure to the cap.

12. A cap arrangement for covering a necked opening, having an open and closed position, the arrangement comprising:

(a) a cap having at least one internal spring which is retained within the cap by an internal annular recess or pocket indents corresponding in number to the spring ends, the at least one internal spring positioned to engage a rim of the necked opening with sufficient tension to retain the cap in its closed position but to permit easy withdrawal of the cap upon application of suitable pressure to the cap, (b) an extension member extending from the cap and integral therewith; and (c) a flexible retaining spring for securing the cap to the neck in proximity to the opening, the flexible retaining spring having first and second ends and being hinged at its first end to the distal end of the extension member providing a non-fixed pivot point positioned in a plane laterally spaced from the cap and neck whereby the cap pivots between its open and closed positions, and at its second end is coupled to the neck of the opening.

13. The cap arrangement of claim 12 wherein the flexible retaining spring further comprises a detent at its first end, which when the cap is in its open position, the detent bears firmly on a flat surface of the extension member and forces the cap to remain open and clear of the necked opening.

14. The cap arrangement of claim 13 wherein the flexible retaining spring is secured to the neck of the opening by a wireform, the cap arrangement further comprising an overload restraint which is secured to the neck of the opening and is so shaped as to limit deformity of the flexible retaining spring upon use.

15. The cap arrangement of claim 13 wherein the flexible retaining spring is selected from the group of L- and U-shaped springs.

16. The cap arrangement of claim 13 for a fuel tank fill neck.

17. A fuel tank fill neck arrangement comprising: a fuel tank fill neck which terminates at its outer end with an adapter for coupling to a fuelling nozzle and a cap arrangement of claim 13 wherein the flexible retaining spring extends from the cap to the adapter.

18. A fuel tank arrangement comprising a fuel tank having an opening which terminates with an adapter for coupling to a fuelling nozzle and a cap arrangement of claim 13, wherein the flexible retaining spring extends from the cap to the adapter.

19. A cap arrangement for a fuel tank fill neck which terminates at its outer end with an adapter for coupling to a fuelling nozzle, the cap arrangement having an open and closed position, the arrangement comprising:

(a) a cap having two internal springs which are retained within the cap by pocket indents corresponding in number to the number of spring ends, wherein the indents are positioned so that at least one internal spring positioned in the indents engages a rim of the adapter with sufficient tension to retain the cap in its closed position but to permit easy withdrawal of the cap upon application of suitable pressure to the cap, (b) an extension member extending from the cap and integral therewith; and (c) a flexible retaining spring for securing the cap to the neck in proximity to the opening, the flexible retaining spring having first and second ends and being hinged at its first end to the distal end of the extension member providing a non-fixed pivot point laterally spaced from the cap and neck whereby the cap pivots between its open and closed positions, the first end further comprising a detent which when the cap is open bears firmly on a flat surface of the extension member and forces the cap to remain open and clear of the necked opening and permits the cap to be moved to its closed position upon application of suitable pressure to the cap, the flexible retaining spring being secured to the adapter at its second end by a wireform, the cap arrangement further comprising an overload restraint which is secured to the adapter and is so shaped as to limit deformity of the flexible retaining spring during use.

20. A cap comprising internal spring means for engaging a rim of a necked opening, the internal spring means comprising at least one spring and an internal spring retaining means, formed in the cap, for holding the at least one spring, the internal spring retaining means selected from the group consisting of an internal annular recess and pocket indents corresponding in umber to the number of spring ends, and the recess and indents being sized to receive and retain the ends of the spring, the retaining means and spring positioned so that the spring engages a rim of the necked opening with sufficient tension to retain the cap but to permit easy withdrawal of the cap upon applications of suitable pressure.

* * * * *